(12) United States Patent
Weber

(10) Patent No.: US 6,605,909 B2
(45) Date of Patent: Aug. 12, 2003

(54) DYNAMIC HORIZONTAL LINEARITY CORRECTION

(75) Inventor: Rudolph Weber, Meilen (CH)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/125,113

(22) Filed: Apr. 18, 2002

(65) Prior Publication Data

US 2003/0030389 A1 Feb. 13, 2003

Related U.S. Application Data

(60) Provisional application No. 60/311,508, filed on Aug. 10, 2001.

(51) Int. Cl.$^7$ .............................................. H05B 29/56
(52) U.S. Cl. ....................................... 315/370; 315/408
(58) Field of Search .................................. 315/370, 408

(56) References Cited

U.S. PATENT DOCUMENTS

| | | |
|---|---|---|
| 4,281,275 A | 7/1981 | Chapman et al. |
| 4,423,358 A | 12/1983 | den Hollander |
| 4,468,593 A | 8/1984 | Haferl |
| 4,516,058 A | 5/1985 | Haferl |
| 4,634,938 A | 1/1987 | Haferl |
| 4,719,392 A | 1/1988 | Haferl |
| 5,182,504 A * | 1/1993 | Haferl ........................ 315/370 |
| 5,661,375 A | 8/1997 | Haferl |
| 6,222,328 B1 | 4/2001 | Kikuchi et al. |

* cited by examiner

*Primary Examiner*—David Vu
(74) *Attorney, Agent, or Firm*—Joseph S. Tripoli; Harvey D. Fried; Sammy S. Henig

(57) ABSTRACT

A horizontal deflection circuit output stage includes a trace capacitor for developing a trace voltage. A retrace capacitance is coupled to a deflection winding to form a retrace resonant circuit with the deflection winding, during a retrace interval of a deflection cycle. A rectifier for rectifying a retrace pulse voltage developed in the retrace capacitance. A switching transistor is coupled to the inductance and to the trace capacitor for applying the rectified retrace pulse voltage to the inductance to generate a current in the inductance. The inductance current is coupled to the trace capacitor, during the trace interval, to provide for linearity correction. The rectifier is coupled to the switching transistor for producing a rectified control signal at a control terminal of the switching transistor to cause a change of state in the switching transistor, during the retrace interval.

10 Claims, 3 Drawing Sheets

DYNAMIC HORIZONTAL LINEARITY CORRECTION

CROSS REFERENCE TO RELATED APPLICATIONS

This is a non-provisional application which claims the benefit of provisional application serial No. 60/311,508, filed Aug. 10, 2001.

BACKGROUND OF THE INVENTION

The invention relates to a a linearity corrected deflection apparatus of a cathode ray tube (CRT).

A horizontal or line deflection circuit produces a horizontal deflection current in a horizontal deflection winding that is mounted on a neck of a CRT. Line deflection circuits are subject to asymmetrical horizontal linearity errors caused by losses in the horizontal deflection winding and the trace switch.

Typically, a CRT having a reduced length or depth is formed with an increased deflection angle. A CRT with a deflection angle greater than 110° requires a large amount of inside and outside pincushion distortion correction. A large amount of these distortion corrections require extensive amplitude and frequency modulation of the deflection current at a vertical rate. All these increased modulations of the deflection current increase horizontal linearity distortion.

An active linearity correction circuit is described in U.S. Pat. No. 4,634,938, in the name of Haferl, entitled, Linearity Corrected Deflection Circuit (The Haferl Patent). In the Haferl Patent, the S-shaping or trace capacitor acquires an additional charge during trace to obtain an increased deflection current during the second half of trace. This additional charge is taken out of the trace capacitor during retrace to avoid a DC component in the deflection current. In the Haferl Patent, an inductor is responsive to a deflection retrace pulse voltage for supplying a correction current to the trace capacitor, during the trace interval.

SUMMARY OF THE INVENTION

A deflection apparatus with raster distortion correction, embodying an inventive feature, includes a deflection winding. A retrace, first capacitance is coupled to the deflection winding to form a retrace resonant circuit with the deflection winding, during a retrace interval. A trace, second capacitor is coupled to the deflection winding to form a trace resonant circuit with the deflection winding, during a trace interval. A source of a synchronizing signal at a frequency related to a first deflection frequency is provided. A first switching semiconductor is responsive to the synchronizing signal and coupled to the deflection winding and to the retrace first capacitance to generate a first retrace pulse voltage in the retrace, first capacitance, during the retrace interval, and a deflection current in the deflection winding. A charge holding, third capacitance is provided. A sampling switching semiconductor is responsive to the first retrace pulse voltage and coupled to the third capacitance for sampling the first retrace pulse voltage and for developing a sampled voltage from a charge stored in the third capacitance. The sampled voltage is indicative of a magnitude of the first retrace pulse voltage. A first inductance is coupled to the third capacitance for applying the sampled voltage to the first inductance, during the trace interval, to generate a current in the first inductance. The first inductance current is coupled to the trace, second capacitor for varying, in accordance with the first inductance current, a trace voltage in the second capacitor to provide raster distortion correction.

Using the charge holding third capacitor provides design flexibility for obtaining the desirable waveform of the correction current.

DESCRIPTION OF THE PREFERRED EMBODIMENTS

Figure 1:
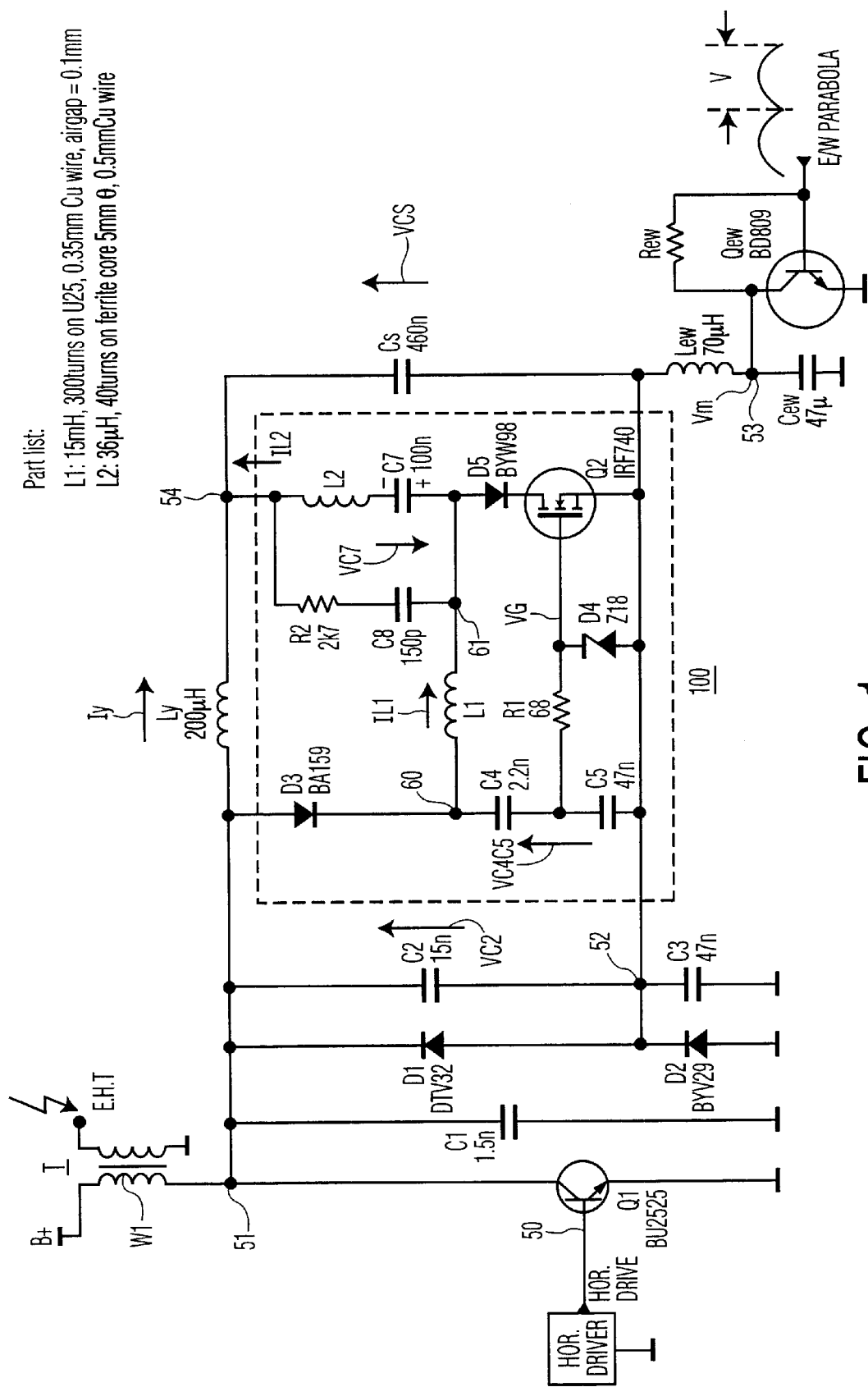
FIG. 1 illustrates a schematic diagram of a deflection circuit, embodying an inventive feature.

FIG. 1 illustrates a schematic diagram of a deflection circuit 100, embodying an inventive feature. Deflection circuit 100 operates at a horizontal frequency of, for example 2×fH and a period of one-half H. The term fH denotes the horizontal frequency in a television standard such as 15,625 KHz. Similarly, the term H denotes the horizontal period in the television standard.

Deflection circuit 100 includes a primary winding W1 coupled to a source of a constant value supply voltage B+. Winding W1 of a conventional flyback transformer T is also coupled to a horizontal output or switching transistor Q1 controlled by a horizontal drive signal 50 having approximately 50% duty cycle. An emitter voltage of transistor Q1 is at a common conductor potential, or ground. A retrace capacitor C1 is coupled to a terminal 51 and in parallel with transistor Q1.

A junction terminal 51 of winding W1 and a collector of transistor Q1 is coupled to a retrace capacitor C2. A terminal 52 of retrace capacitor C2 is coupled to a retrace capacitor C3. A damper diode D1 is coupled in parallel with capacitor C2. A damper diode D2 is coupled in parallel with capacitor C3. Junction terminal 52 is coupled to an East-West modulation inductor Lew. Inductor Lew has a terminal 53 that is coupled to a collector of an East-West modulation transistor Qew and to a filter capacitor Cew to form a conventional diode modulator that provides outside pincushion distortion correction.

Transistor Qew is controlled in a conventional manner by a vertical rate parabolic manner East-West modulation signal E/W-DRIVE having a period V. The term V denotes the vertical period in the television standard, such as 20 millisecond. A feedback resistor transistor Rew is coupled between the collector and base of transistor Qew to provide operation in class A mode of operation. A vertical rate parabolic manner modulation voltage Vm is developed at terminal 53, in a conventional manner. A conventional S-shaping capacitor Cs is coupled between terminal 52 and a terminal 54. A deflection winding Ly is coupled between terminals 51 and 54.

A linearity correction arrangement 120, embodying an inventive feature, includes circuit elements shown inside a box drawn in a broken line that provides linearity correction. With the exception of the operation of linearity correction arrangement 120, deflection circuit 100 produces a deflection current Iy in winding Ly in a conventional manner and operates as a conventional diode modulator.

At the beginning of horizontal retrace, transistor Q1 becomes non-conductive and produces a retrace pulse voltage in capacitor C2. Because of the modulation produces by transistor Qew, retrace voltage VC2 in capacitor C2 has a peak amplitude, during horizontal retrace, that varies in a vertical rate parabolic manner. Thereby, amplitude modulation of a deflection current Iy in winding Ly is provided at a vertical rate. During horizontal trace, the voltage at terminal 51 is close to zero volts because either both diodes D1 and D2 are conductive or transistor Q1 is conductive.

A sampling diode D3, embodying an inventive feature, is coupled between terminal 51 of capacitor C2 and a terminal 60 of a capacitor C4. Capacitor C4 is coupled in series with a capacitor C5 between terminals 51 and 52. The arrangement of diode D3 and capacitors C4 and C5 forms a sample-and-hold circuit.

In carrying out an inventive feature, retrace voltage VC2 is sampled via diode D3 for generating a rectified or sampled voltage VC4C5 in charge holding capacitors C4 and C5. Rectified or sampled voltage VC4C5 is equal to the peak value of voltage VC2 and is proportional to the peak amplitude of deflection current Iy in winding Ly in each horizontal period. The peak value of voltage VC4C5 varies in a vertical rate parabolic manner and tracks the peak amplitude variations of deflection current Iy. Sampled voltage VC4C5 is applied via terminal 60 to a linearity correction inductor L1.

Voltage VC4C5 generates a linearity correction current IL1 in inductor L1, during retrace and during trace. The charged stored in capacitors C4 and C5 and voltage VC4C5 decrease gradually, during horizontal trace. A magnitude of current IL1 is determined by the charged stored in capacitors C4 and C5.

The charge stored in capacitors C4 and C5 is determined by the values of capacitors C2, C4 and C5. For a given value of inductor L1, the charge stored in capacitors C4 and C5 mainly depends on the ratio of the values of capacitors C4 and C2. The effect of capacitor C5 is small, because capacitor C5 is a relatively large capacitor and develops a relatively low voltage. Thus, advantageously, the magnitude of current IL1 can be selected by selecting the ratio of the values of capacitors C4 and C2.

A terminal 61 of inductor L1 is coupled to an anode of a diode D5. Diode D5 is coupled in series with a metal oxide semiconductor (MOS) transistor Q2. A portion of voltage VC4C5, developed in capacitor C5, drives a gate of transistor Q2 via a gate resistor R1 to produce a gate voltage VG. A voltage limiting zener diode D4 is coupled to the gate of transistor Q2.

During horizontal retrace, voltage VG turns on transistor Q2 and causes diode D5 to become conductive. After the center of retrace, inductor L1 begins discharging capacitor C5. Consequently, the gate capacitance, not shown, of transistor Q2 is discharged via a gate resistor R1, causing gate voltage VG of transistor Q2 to decrease until transistor Q2 is turned off.

During horizontal trace, current IL1 flows in an inductor L2 as a current IL2. Current IL2 flows also in a capacitor C7 and capacitor Cs for increasing voltage VCS. An increase in voltage VCS, during trace, corrects linearity errors, in a well known manner. The peak amplitude of voltage VCS at a given portion of horizontal trace varies in a vertical rate parabolic manner, during vertical trace, and, advantageously, closely tracks the variation in the peak amplitude of deflection current iy.

A direct current (DC) blocking capacitor C7 is coupled in series with inductor L2, between terminals 54 and 61. Capacitor C7 prevents current IL2 from containing any DC current component. Any DC current component in current IL2 would have produced an undesirable centering offset or shift.

During trace, current IL2 flows in the direction shown by the arrow and charges capacitor C7. Therefore, a voltage VC7 is developed from current IL2 in capacitor C7 in the polarity shown.

On the other hand, during retrace, transistor Q2 and diode D5 are turned on, as explained before. Thereby, inductor L2, capacitor C7 and capacitor Cs form a resonant circuit that produces a half cycle of resonant current IL2. The half cycle of resonant current IL2 varies in a sinusoidal manner in a negative polarity, opposite to that shown by the arrow. Negative current IL2 discharges capacitor C7 to decrease voltage VC7. Voltage VC7 reaches zero volts at the negative peak of current IL2 and becomes negative at the end of the sinusoidal half cycle in current IL2. Consequently, the arrangement formed by capacitor C7, inductor L2, diode D5 and transistor Q2 prevents any undesirable build-up of excessive DC voltage component in voltage VC7.

The resonance frequency of the resonant circuit formed by inductor L2, capacitor C7 and capacitor Cs, during retrace, can be, preferably, the same as or higher than the retrace resonance frequency. Preferably, the resonance frequency of the resonant circuit formed by inductor L2, capacitor C7 and capacitor Cs should not be selected too high since the dissipation increases with frequency. A capacitor C8 and a resistor R2 that are coupled in series between terminals 54 and 61 prevent ringing caused by diode D5.

During start-up, it may be desirable to produce horizontal drive signal 50 at a frequency that is higher than the frequency, during normal operation. Thereby, soft start can be provided in transistor Q1. The higher frequency of signal 50 can undesirably result in an excessive DC current in a DC current path from voltage B+ to ground formed by Diode D3, inductor L1, diode D5, transistor Q2, inductor Lew and transistor Qew. It can be desirable to prevent the formation of the DC current path from voltage B+ to ground via diode D3, inductor L1, diode D5, transistor Q2, inductor Lew and transistor Qew.

Figure 2:
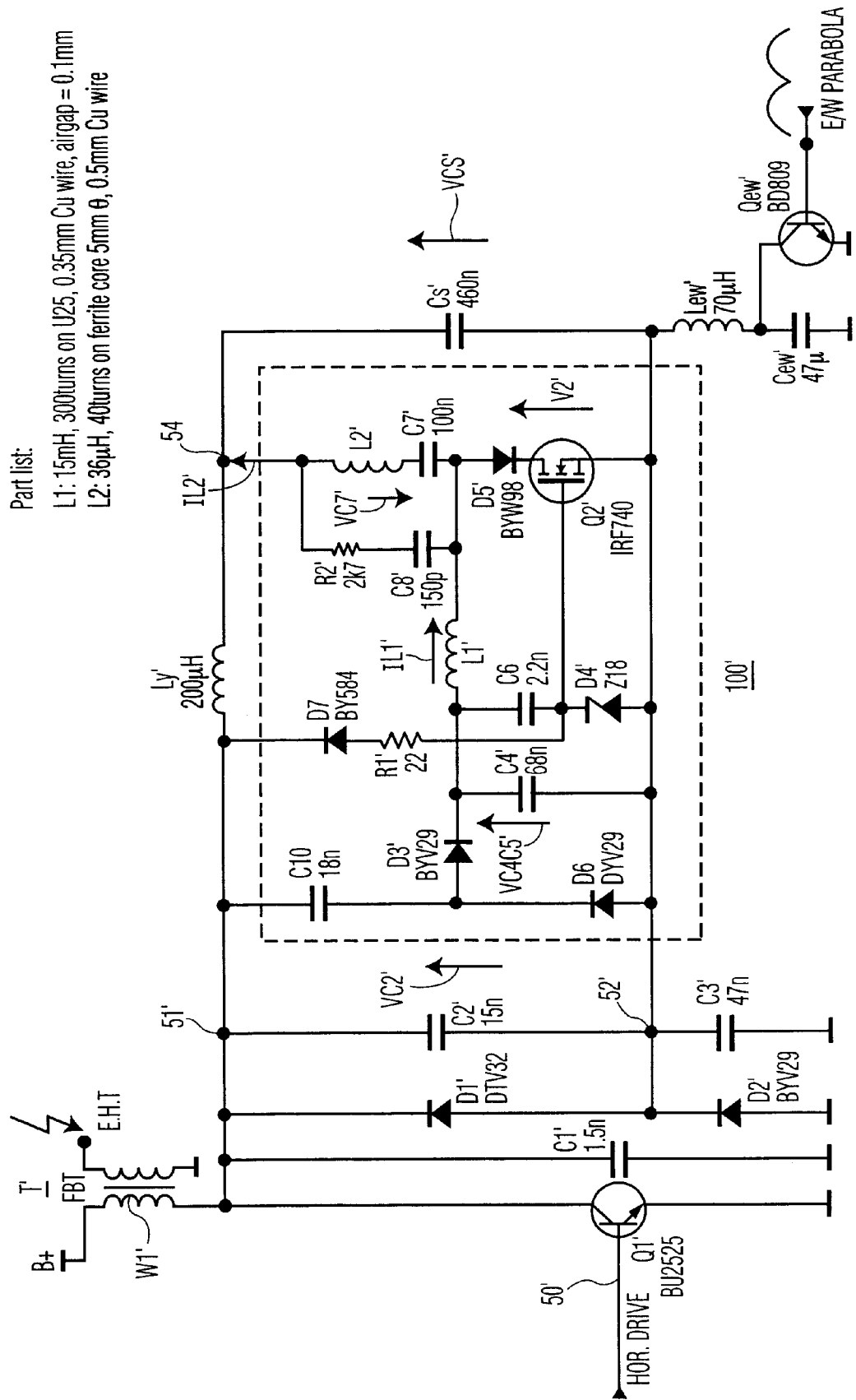
FIG. 2 illustrates a schematic diagram of a deflection circuit, embodying another inventive feature.
Figures 3A, 3B, 3C:
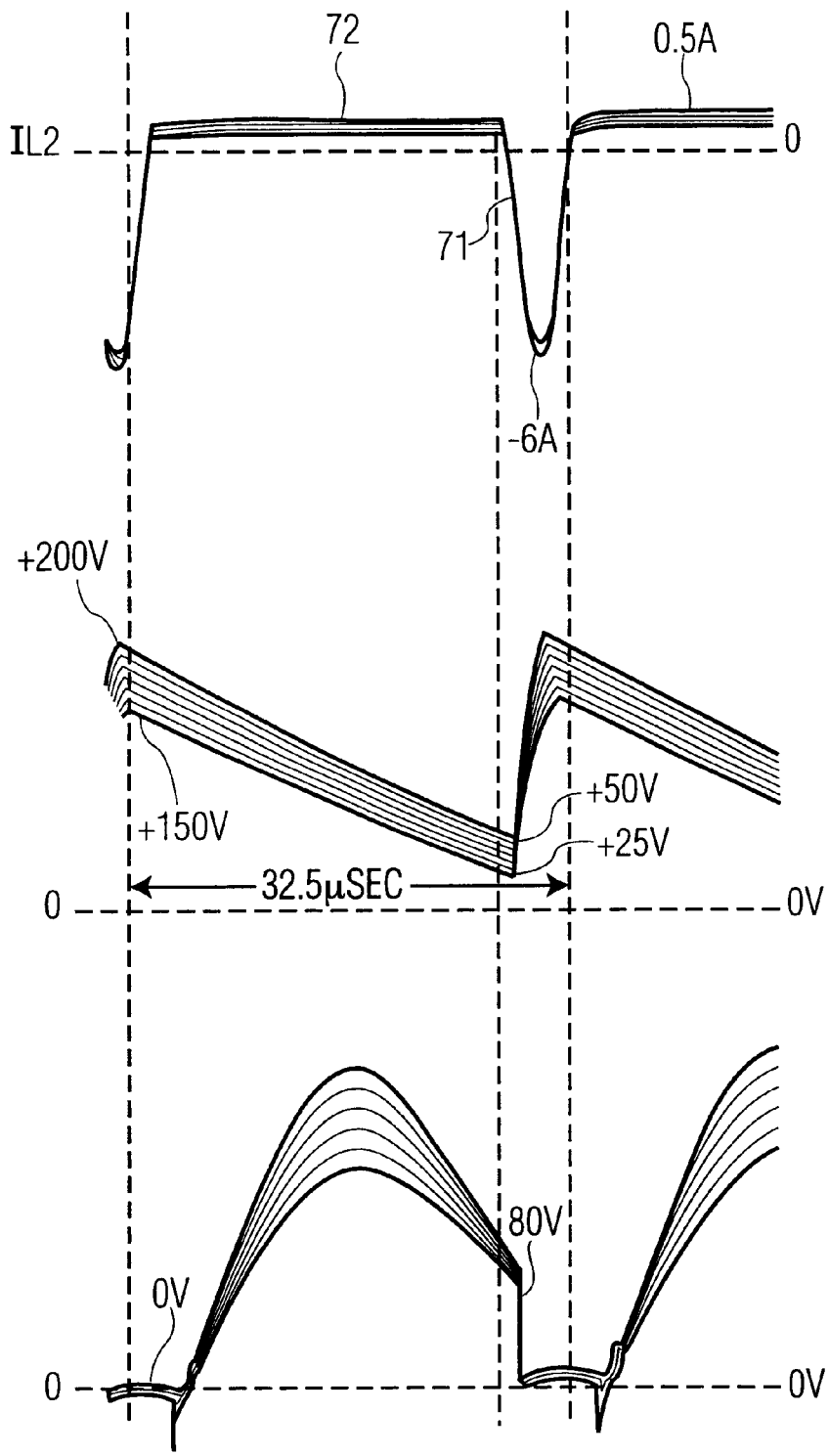
FIGS. 3a, 3b and 3c illustrate waveforms useful for explaining the operation of deflection circuit of FIG. 2.

FIG. 2 illustrates a schematic diagram of a deflection circuit 100', embodying another inventive feature, for preventing any DC current, during start-up. Deflection circuit 100' depicts an alternating current (AC) —coupled version of deflection circuit 100 of FIG. 1. FIGS. 3a, 3b and 3c illustrate waveforms useful for explaining the operation of deflection circuit 100' of FIG. 2. Similar symbols and numerals in FIGS. 1, 2 and 3a–3d indicate similar items or functions.

In deflection circuit 100' of FIG. 2, retrace voltage VC2' is AC-coupled via a capacitor C10 and sampled via diode D3' for developing a sampled voltage VC4C5' of FIG. 3b in a charge holding capacitor C4' of FIG. 2 that is analogous to series coupled capacitors C4 and C5 of FIG. 1. Capacitor C10 of FIG. 2 prevents the formation of a DC current path from voltage B+ to ground via inductor L1'. Except for the AC coupling formed by capacitor 10, deflection circuit 100' operates similarly to deflection circuit 100 of FIG. 1.

The amount of linearity correction is selected by the values of capacitors C2', C10 and C4' of FIG. 2. Capacitor C6 couples a portion of voltage VC4C5' to the gate of transistor Q2' for turning on transistor Q2', during retrace, as explained before. Resistor R1' is coupled in series with a diode D7 between terminal 51' and the gate of transistor Q2' for discharging a gate capacitance, not shown, of transistor Q2', at the end of retrace and for maintaining it discharged, throughout trace. Consequently, transistor Q2' is non-conductive, throughout trace.

During trace, a positive portion 72 of current IL2' of FIG. 3a charges capacitor C7' of FIG. 2. Therefore, a sum of voltages VC7' and VCS' increases. Consequently, at the end of trace, a voltage V2' of FIG. 3c across the series arrangement of diode D5' and transistor Q2' is higher than at the beginning of trace. Because of discharging capacitor C4', voltage VC4C5' of FIG. 3b decreases gradually, during horizontal trace. Therefore, advantageously, the waveform of current IL2' of FIG. 3a is closer to the ideal waveform than if voltage VC4C5' were present only during horizontal retrace.

During retrace, a resonant portion 71 of current IL2', produced by a resonant circuit that includes capacitor C7' and inductor L2', forms a half cycle sinusoidal waveform of current IL2' having a negative polarity, for reversing the polarity of voltage VC7' of FIG. 2. Consequently, the DC voltage component of voltage VC7' is advantageously eliminated.

What is claimed is:

1. A deflection apparatus with raster distortion correction, comprising:

a deflection winding;

a retrace, first capacitance coupled to said deflection winding to form a retrace resonant circuit with said deflection winding, during a retrace interval;

a trace, second capacitor coupled to said deflection winding to form a trace resonant circuit with said deflection winding, during a trace interval;

a source of a synchronizing signal at a frequency related to a first deflection frequency;

a first switching semiconductor responsive to said synchronizing signal and coupled to said deflection winding and to said retrace first capacitance to generate a first retrace pulse voltage in said retrace first capacitance, during said retrace interval, and a deflection current in said deflection winding;

a charge holding, third capacitance;

a sampling switching semiconductor responsive to said first retrace pulse voltage and coupled to said third capacitance for sampling said first retrace pulse voltage and for developing a sampled voltage from a charge stored in said third capacitance that is indicative of a magnitude of said first retrace pulse voltage; and a first inductance coupled to said third capacitance for applying said sampled voltage to said first inductance, during said trace interval, to generate a current in said first inductance, said first inductance current being coupled to said trace, second capacitor for varying, in accordance with said first inductance current, a trace voltage in said second capacitor to provide raster distortion correction.

2. A deflection apparatus according to claim 1, further comprising a fourth capacitor for preventing a direct current component included in said first inductance current from charging said trace second capacitor.

3. A deflection apparatus according to claim 2, further comprising a third switching semiconductor coupled to said fourth capacitor for discharging, during said retrace interval, a charge that accumulates in said fourth capacitor, during said trace interval.

4. A deflection apparatus according to claim 3, further comprising a second inductance coupled in a current path of said first inductance current, during said trace interval, wherein said third switching semiconductor has a main current conducting terminal that is coupled in said first inductance current path, at a junction between said first and second inductances.

5. A deflection apparatus according to claim 2, further comprising a second inductance coupled to said fourth capacitor, wherein said second inductance and said fourth capacitor form a resonant circuit, during said trace interval.

6. A deflection apparatus according to claim 1, further comprising a source of a modulation signal at a frequency related to a second deflection frequency and a modulator coupled to said retrace first capacitance for modulating said first retrace pulse voltage at a frequency related to said second deflection frequency, wherein said first inductance current magnitude varies in accordance with said modulation signal.

7. A deflection apparatus according to claim 6, wherein said modulator provides at least one of inside pincushion distortion correction and outside pincushion distortion correction.

8. A deflection apparatus according to claim 6, wherein said modulator comprises a diode modulator.

9. A deflection apparatus according to claim 1, further comprising a supply inductance for developing a direct current voltage in said trace second capacitor, wherein a fourth capacitor is coupled in a current path that includes said first inductor and said supply inductance for blocking a direct current in said current path.

10. A deflection apparatus according to claim 1, wherein said first inductance current provides for linearity correction.

* * * * *